US 11,365,895 B2

(12) United States Patent
Seo et al.

(10) Patent No.: US 11,365,895 B2
(45) Date of Patent: Jun. 21, 2022

(54) FLOATING-TYPE HUMIDIFIER HAVING INCREASED AMOUNT OF HUMIDIFICATION

(71) Applicant: MIRO CO., LTD., Incheon (KR)

(72) Inventors: Dong Jin Seo, Incheon (KR); Yong Ju Oh, Incheon (KR); Min Seok Kim, Incheon (KR); Jeong Won Lee, Incheon (KR)

(73) Assignee: MIRO CO., LTD., Incheon (KR)

( * ) Notice: Subject to any disclaimer, the term of this patent is extended or adjusted under 35 U.S.C. 154(b) by 483 days.

(21) Appl. No.: 16/308,371

(22) PCT Filed: Sep. 26, 2017

(86) PCT No.: PCT/KR2017/010642
§ 371 (c)(1),
(2) Date: Mar. 25, 2019

(87) PCT Pub. No.: WO2018/056793
PCT Pub. Date: Mar. 29, 2018

(65) Prior Publication Data
US 2019/0309967 A1 Oct. 10, 2019

(30) Foreign Application Priority Data
Sep. 26, 2016 (KR) .......................... 10-2016-0123413

(51) Int. Cl.
*F24F 6/14* (2006.01)
*F24F 3/14* (2006.01)
(Continued)

(52) U.S. Cl.
CPC .................. *F24F 6/14* (2013.01); *F24F 3/14* (2013.01); *F24F 6/00* (2013.01); *F24F 13/20* (2013.01); *B05B 17/06* (2013.01); *Y02B 30/70* (2013.01)

(58) Field of Classification Search
CPC ........ F24F 6/14; F24F 6/00; F24F 3/14; F24F 13/20; F24F 2013/205; F24F 2006/008;
(Continued)

(56) References Cited

U.S. PATENT DOCUMENTS 3,584,192 A * 6/1971 Maag ....................... F24F 6/025
392/406
3,901,443 A * 8/1975 Mitsui ................. B05B 17/0615
239/102.2
(Continued)

FOREIGN PATENT DOCUMENTS

CN 2208680 Y 9/1995
CN 203757941 U 8/2014
(Continued)

*Primary Examiner* — Stephen Hobson
(74) *Attorney, Agent, or Firm* — Novick, Kim & Lee, PLLC; Sang Ho Lee; Hyun Woo Shin

(57) ABSTRACT

A floating type humidifier with an increased humidification amount according to an exemplary embodiment of the present invention includes: a floating body which floats on water accommodated in a water tub and has a hollow portion vertically and penetratively formed at a central portion of the floating body; an ultrasonic generator which is installed in the hollow portion and configured to atomize water, which is introduced at a lower portion, to create humidification particles by using ultrasonic vibration; a humidification particle guide unit which is installed on an upper portion of the floating body and guides the humidification particles so that the humidification particles move upward along a guide hole in the humidification particle guide unit; and an air pressurizing portion which is provided in the humidification particle guide unit and pressurizes air so that the humidification particles are moved upward by the pressurized air.

11 Claims, 9 Drawing Sheets

(51) Int. Cl.
*F24F 13/20* (2006.01)
*F24F 6/00* (2006.01)
*B05B 17/06* (2006.01)

(58) Field of Classification Search
CPC ....... F24F 6/06; F24F 2006/143; B05B 17/06; Y02B 30/70
See application file for complete search history.

(56) References Cited

U.S. PATENT DOCUMENTS

| | | | | |
|---|---|---|---|---|
| 5,673,360 | A * | 9/1997 | Scripps | F24F 6/025 220/8 |
| 5,940,578 | A * | 8/1999 | Goddard | B01D 1/0005 392/406 |
| 6,592,107 | B1 * | 7/2003 | Wong | F24F 6/02 261/107 |
| 9,776,144 | B1 * | 10/2017 | Lu | F24F 13/20 |
| 10,060,640 | B2 * | 8/2018 | Kim | B01F 3/0407 |
| 10,066,846 | B2 * | 9/2018 | Kim | F24F 6/12 |
| 10,247,433 | B2 * | 4/2019 | Son | B01F 3/04049 |
| 10,330,332 | B2 * | 6/2019 | Seo | F24F 6/12 |
| 10,598,396 | B2 * | 3/2020 | Seo | F24F 6/02 |
| 2008/0074864 | A1 | 3/2008 | Molders | |
| 2014/0326802 | A1 * | 11/2014 | Ljuhar | B05B 17/0615 239/102.2 |
| 2015/0323204 | A1 * | 11/2015 | Seo | B01F 3/0407 261/30 |
| 2016/0318059 | A1 * | 11/2016 | Osborn | B05B 17/0615 |
| 2017/0056914 | A1 * | 3/2017 | Beaumont | A61L 9/122 |
| 2017/0252768 | A1 * | 9/2017 | Oh | B01F 3/0407 |
| 2019/0210054 | A1 * | 7/2019 | Chan | B05B 17/0607 |

FOREIGN PATENT DOCUMENTS

| | | |
|---|---|---|
| CN | 105026844 A | 11/2015 |
| JP | 55-037446 U | 3/1980 |
| JP | 63-086509 U | 1/1990 |
| JP | H02-9734 U | 1/1990 |
| JP | 02-076961 U | 3/1992 |
| JP | H04-36538 U | 3/1992 |
| JP | 2015-200454 A | 11/2015 |
| JP | 2016-522383 A | 7/2016 |
| KR | 10-1998-0084036 A | 12/1988 |
| KR | 10-1374967 B1 | 3/2014 |
| KR | 10-1423288 B1 | 7/2014 |
| KR | 10-2015-0090842 A | 8/2015 |
| KR | 10-1574146 B1 | 12/2015 |

* cited by examiner

FLOATING-TYPE HUMIDIFIER HAVING INCREASED AMOUNT OF HUMIDIFICATION

TECHNICAL FIELD

The present invention relates to a floating type humidifier with an increased humidification amount, and more particularly, to a floating type humidifier in which a humidification amount is maximized by using air pressure raised by an air pressurizing unit formed in the humidifier.

BACKGROUND ART

In general, a humidifier is a device for providing moisture into a dry room. Based on humidification modes, the humidifier is classified into an ultrasonic humidifier using ultrasonic waves and a heating humidifier using a heater.

First, the ultrasonic humidifier changes water into fine water droplets by using an ultrasonic vibrator installed in a water tub and then sprays the fine water droplets in an atomized state by using a blower fan. In contrast, the heating humidifier vaporizes water by using heat of a heater installed in a water tub and then sprays the vapor in an atomized state by using a blower fan.

The two types of humidifiers are used in a state of being installed on a stationary installation surface, but problems about bacterial growth and cleaning are considered as great drawbacks. To solve the drawbacks, natural humidifiers, which are comparatively convenient to manage and clean, are widely used.

Among the natural humidifiers, a floating type humidifier, which is comparatively convenient to manage and clean, is widely used, and the floating type humidifier is characterized by being installed to be movable in a state in which the floating type humidifier floats on the water accommodated in a water tub.

The floating type humidifier in the related art changes water, which flows into the floating type humidifier, into water particles by using ultrasonic waves while floating at a predetermined height in the water tub and then discharges the water particles in an atomized state by using a blower fan.

However, in the floating type humidifier in the related art, a blowing direction of the blower fan is directed toward a center of a passageway through which the water particles are discharged, and as a result, there is a problem in that a large number of atomized water particles are integrated together as water droplets and then fall downward or collide with the passageway opposite to the blower fan, which causes a deterioration in humidification amount.

Meanwhile, as the related art for improving a humidification amount, there is Korean Patent Application Laid-Open No. 10-2015-0090842 entitled "Floating Type Humidifier" (publication date: Aug. 6, 2015).

DISCLOSURE

Technical Problem

An object of the present invention is to provide a floating type humidifier in which a humidification amount is increased by introducing air in an indirect manner and supplying the air into a guide hole from the entire periphery of the guide hole by solving a problem in the related art in which air is supplied only in one direction.

In addition, another object of the present invention is to provide a floating type humidifier in which a humidification amount is maximized by forming an air pressurizing portion by using a double partition wall structure and supplying the pressurized air into the floating type humidifier.

Technical problems of the present disclosure are not limited to the aforementioned technical problem, and other technical problems, which are not mentioned above, may be clearly understood by those skilled in the art from the following descriptions.

Technical Solution

To achieve the aforementioned objects, a floating type humidifier with an increased humidification amount according to an exemplary embodiment of the present invention includes: a floating body which floats on water accommodated in a water tub and has a hollow portion vertically and penetratively formed at a central portion of the floating body; an ultrasonic generator which is installed in the hollow portion and configured to atomize water, which is introduced at a lower portion, to create humidification particles by using ultrasonic vibration; a humidification particle guide unit which is installed on an upper portion of the floating body and guides the humidification particles so that the humidification particles move upward along a guide hole in the humidification particle guide unit; and an air pressurizing portion which is provided in the humidification particle guide unit and pressurizes air so that the humidification particles are moved upward by the pressurized air.

In addition, the humidification particle guide unit according to the exemplary embodiment of the present invention may have a double partition wall structure including an inner wall which extends downward along the guide hole, and an outer wall which is formed to be inclined outward from the inner wall and configured to be coupled to the floating body.

In addition, the air pressurizing portion according to the exemplary embodiment of the present invention may be formed between the inner wall and the outer wall of the humidification particle guide unit.

In addition, the humidification particle guide unit according to the exemplary embodiment of the present invention may include an air introduction portion formed as the inner wall of the humidification particle guide unit and the floating body are spaced apart from each other at a predetermined gap, and the air pressurizing portion and the guide hole may be in communication with each other through the air introduction portion.

In addition, a fan installation hole may be penetratively formed in an outer portion of the humidification particle guide unit according to the exemplary embodiment of the present invention, and a blower fan, which blows air toward the air pressurizing portion, may be installed in the fan installation hole.

In addition, the humidification particle guide unit according to the exemplary embodiment of the present invention may include a recessed groove portion recessed to have a predetermined size at an end of the inner wall of the humidification particle guide unit, and the recessed groove portion may be formed at a position facing the blower fan.

In addition, a horizontal cross-section of the guide hole according to the exemplary embodiment of the present invention may have a circular shape, an elliptical shape, or a polygonal shape.

In addition, a center of the inner wall of the humidification particle guide unit and a center of the hollow portion of the floating body according to the exemplary embodiment of the present invention may be disposed on different vertical lines.

In addition, one side of the inner wall of the humidification particle guide unit according to the exemplary embodiment of the present invention may extend toward the outside of the hollow portion of the floating body.

In addition, the humidification particle guide unit according to the exemplary embodiment of the present invention may include a cleaning groove portion provided in an inner circumferential surface where the inner wall and the outer wall of the humidification particle guide unit abut each other, and the cleaning groove portion may be recessed to be more gradual than the inclination of the outer wall.

In addition, the humidification particle guide unit according to the exemplary embodiment of the present invention may include a gripping groove portion provided in an outer circumferential surface where the inner wall and the outer wall of the humidification particle guide unit abut each other, and the gripping groove portion may be recessed at a side opposite to the cleaning groove portion.

Advantageous Effects

According to present invention, it is possible to increase a humidification amount by introducing air in an indirect manner and supplying the air into the guide hole from the entire periphery of the guide hole by solving the problem in the related art in which air is supplied only in one direction, and it is possible to maximize a humidification amount by forming the air pressurizing portion by using the double partition wall structure and supplying the pressurized air into the floating type humidifier.

In addition, according to the present invention, the recessed groove portion may allow the air, which is introduced from the blower fan, to be introduced directly into the guide hole without colliding with the inner wall of the humidification particle guide unit, thereby pushing the particles, which have larger sizes among the created humidification particles, toward the inner wall at another side.

In addition, according to the present invention, the cleaning groove portion is formed in the inner circumferential surface of the humidification particle guide unit such that the entire inner circumferential surface may be easily cleaned, and the gripping groove portion is formed in the outer circumferential surface such that the gripping groove portion may be used as a handle when cleaning the humidifier or when the humidifier needs to be gripped.

In addition, the inner wall of the humidification particle guide unit according to the present invention is shaped to be tilted toward one side, such that when the humidification particles created by the ultrasonic generator move upward, the humidification particles collide with the inner wall of the humidification particle guide unit formed asymmetrically. Therefore, it is possible to minimize noise that occurs when the integrated humidification particles fall outside the hollow portion and collide with the water surface outside the hollow portion instead of colliding with the water that fills the hollow portion.

DESCRIPTION OF MAIN REFERENCE NUMERALS OF DRAWINGS

Figure 1:
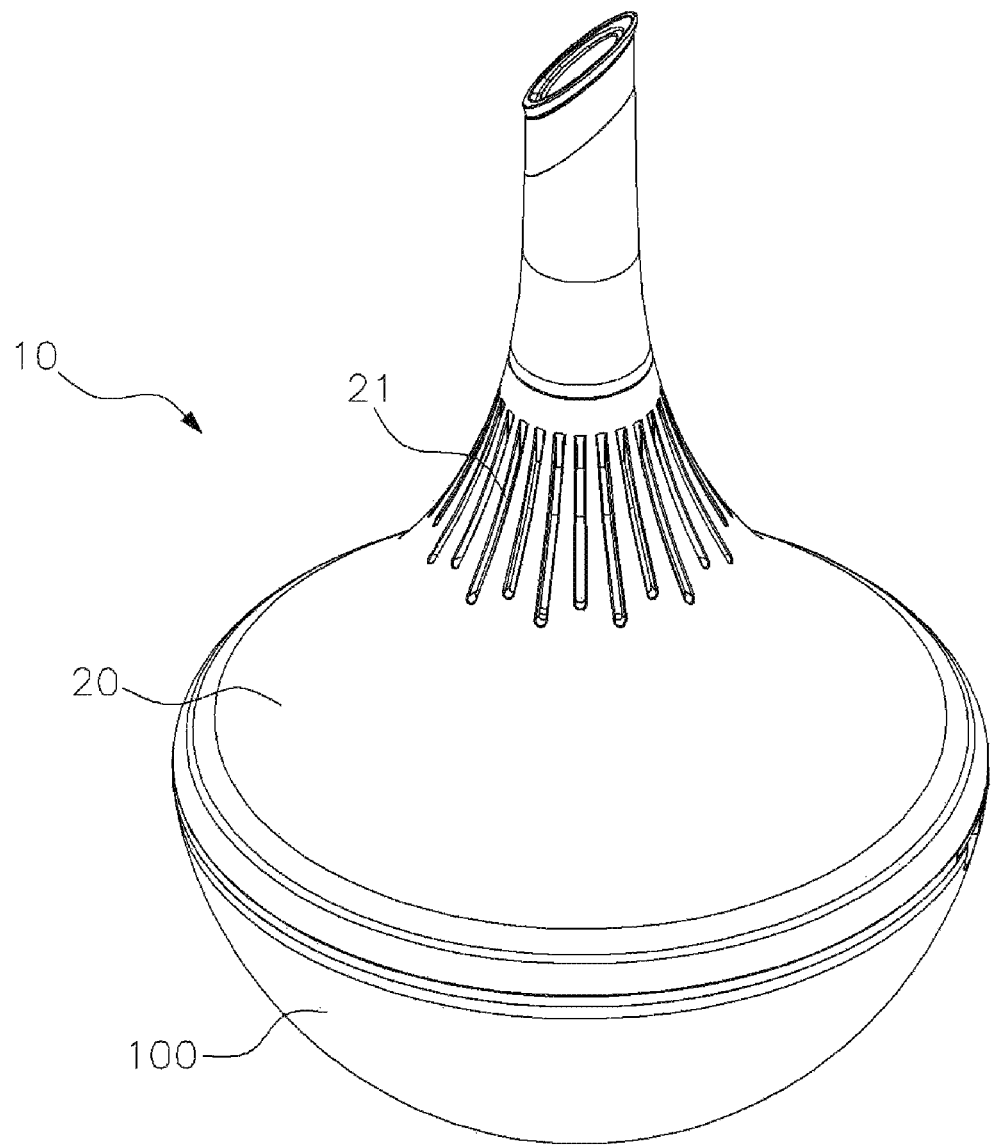
FIG. 1 is a perspective view illustrating a floating type humidifier with an increased humidification amount according to an exemplary embodiment of the present invention.

10: Floating type humidifier
20: Upper casing
21: Air inlet hole
30: Water
40: Cable hole
100: Floating body
101: Hollow portion
110: Ultrasonic generator
120: Humidification particle guide unit
121: Guide hole
122: Air pressurizing portion
123: Inner wall
123a: One side of inner wall
124: Outer wall
125: Air introduction portion
126: Fan installation hole
127: Recessed groove portion
128: Cleaning groove portion
129: Gripping groove portion
130: Blower fan

BEST MODE

Advantages and features of the present invention and methods of achieving the advantages and features will be clear with reference to exemplary embodiments described in detail below together with the accompanying drawings. However, the present invention is not limited to the exemplary embodiments disclosed herein, but will be implemented in various forms, the exemplary embodiments are provided so as to completely disclose the present invention and to completely inform a person with ordinary skill in the art to which the present invention pertains with the scope of the present invention, and the present invention will be defined only by the scope of the appended claims. Like reference numerals indicate like constituent elements throughout the specification.

Figure 2:
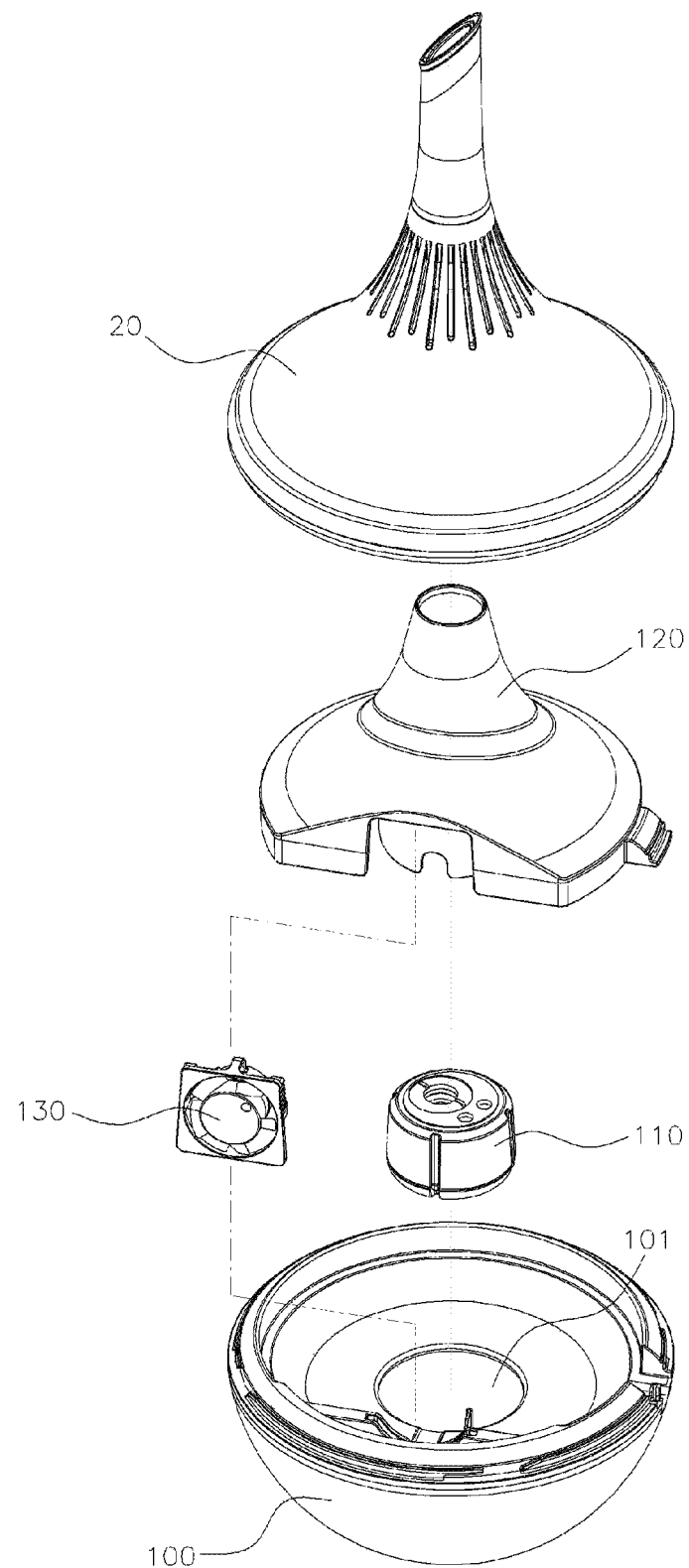
FIG. 2 is an exploded perspective view illustrating the floating type humidifier with the increased humidification amount according to the exemplary embodiment of the present invention.

FIG. 1 is a perspective view illustrating a floating type humidifier with an increased humidification amount according to an exemplary embodiment of the present invention, and FIG. 2 is an exploded perspective view illustrating the floating type humidifier with the increased humidification amount according to the exemplary embodiment of the present invention.

Referring to FIGS. 1 and 2, a floating type humidifier 10 according to an exemplary embodiment of the present invention includes a floating body 100, an ultrasonic generator 110, a blower fan 130, a humidification particle guide unit 120, and an upper casing 20.

The upper casing 20 may be detachably coupled to an upper end portion of the floating body 100 and may be manufactured in the form of a gourd-shaped bottle having an outer diameter that gradually decreases from a lower end to an upper end.

Further, multiple air inlet holes 21, through which outside air is introduced, may be formed at a predetermined interval in an outer surface of an upper end portion of the upper casing 20.

Additionally, a cap (not illustrated) may be provided at an upper end of the upper casing 20 to control a release amount and a release direction of humidification particles created by the ultrasonic generator 110, and a release hole (not illustrated), through which water particles or moisture vapor is discharged, may be additionally formed in the cap (not illustrated).

Here, the water particle or the moisture vapor means the humidification particle, and these terms may have the same meaning hereinafter.

Meanwhile, because the upper casing 20 is somewhat irrelevant to main features of the present invention, the upper casing 20 will be omitted for convenience.

Figure 3:
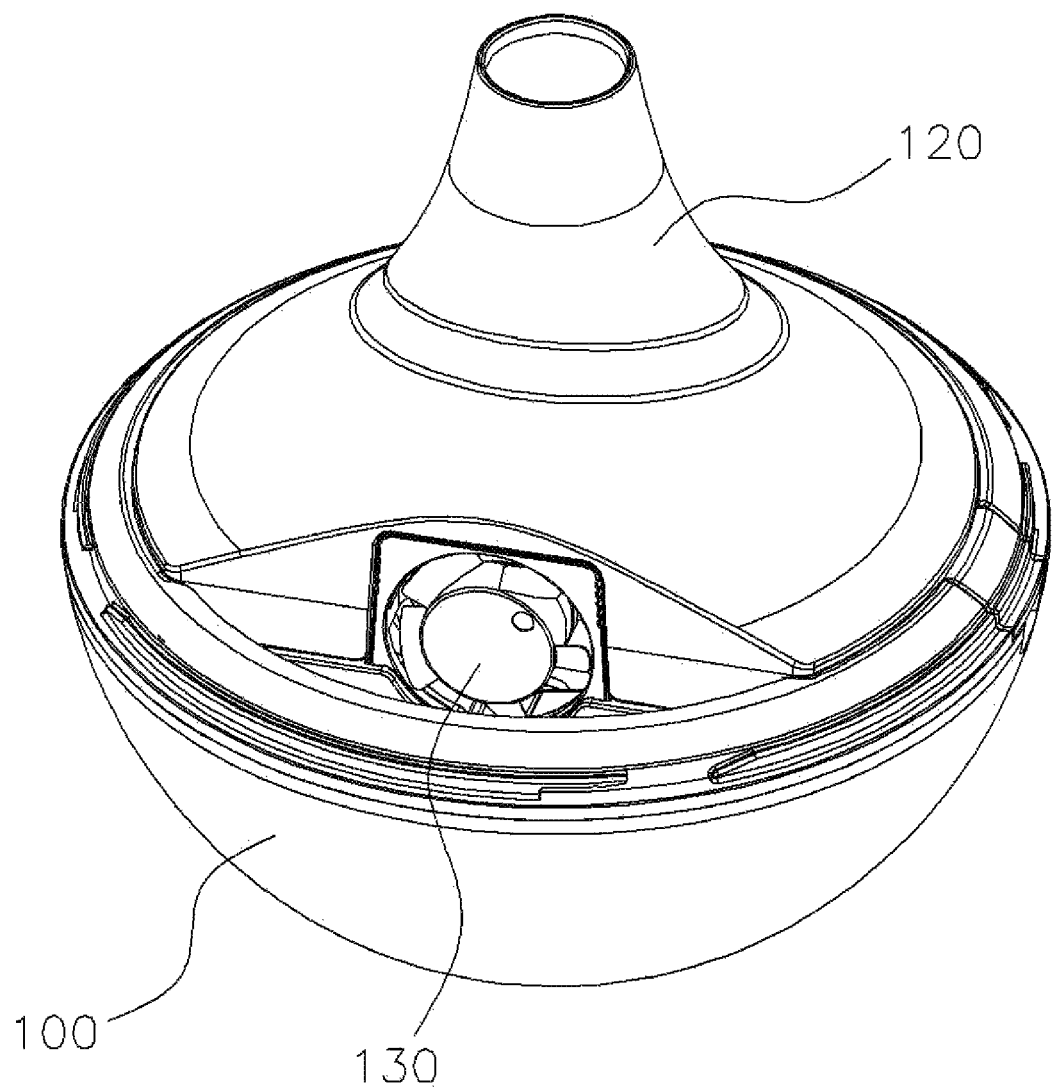
FIG. 3 is a perspective view of the floating type humidifier except for an upper casing in FIG. 1.
Figure 4:
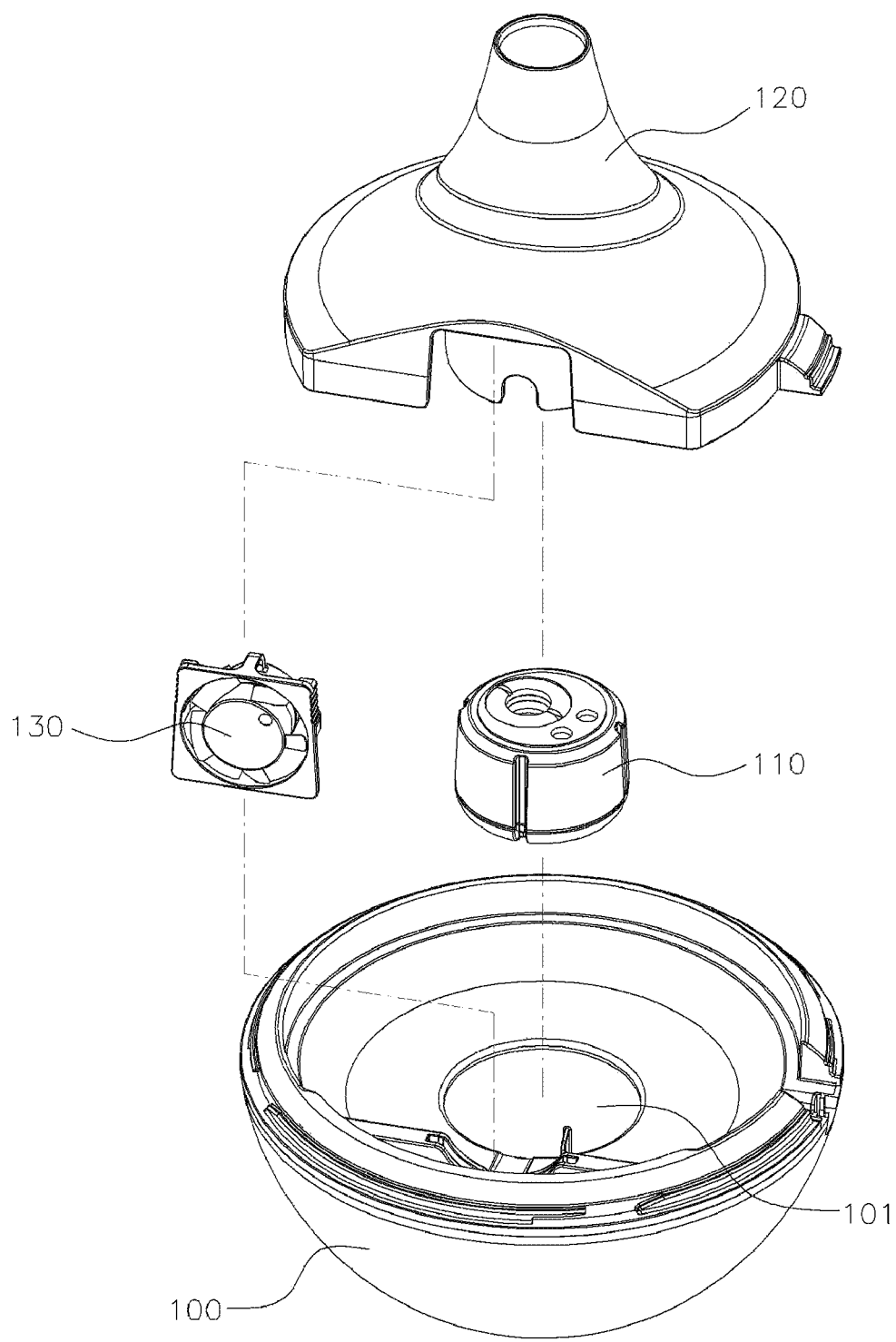
FIG. 4 is an exploded perspective view of the floating type humidifier except for the upper casing in FIG. 2.
Figure 5:
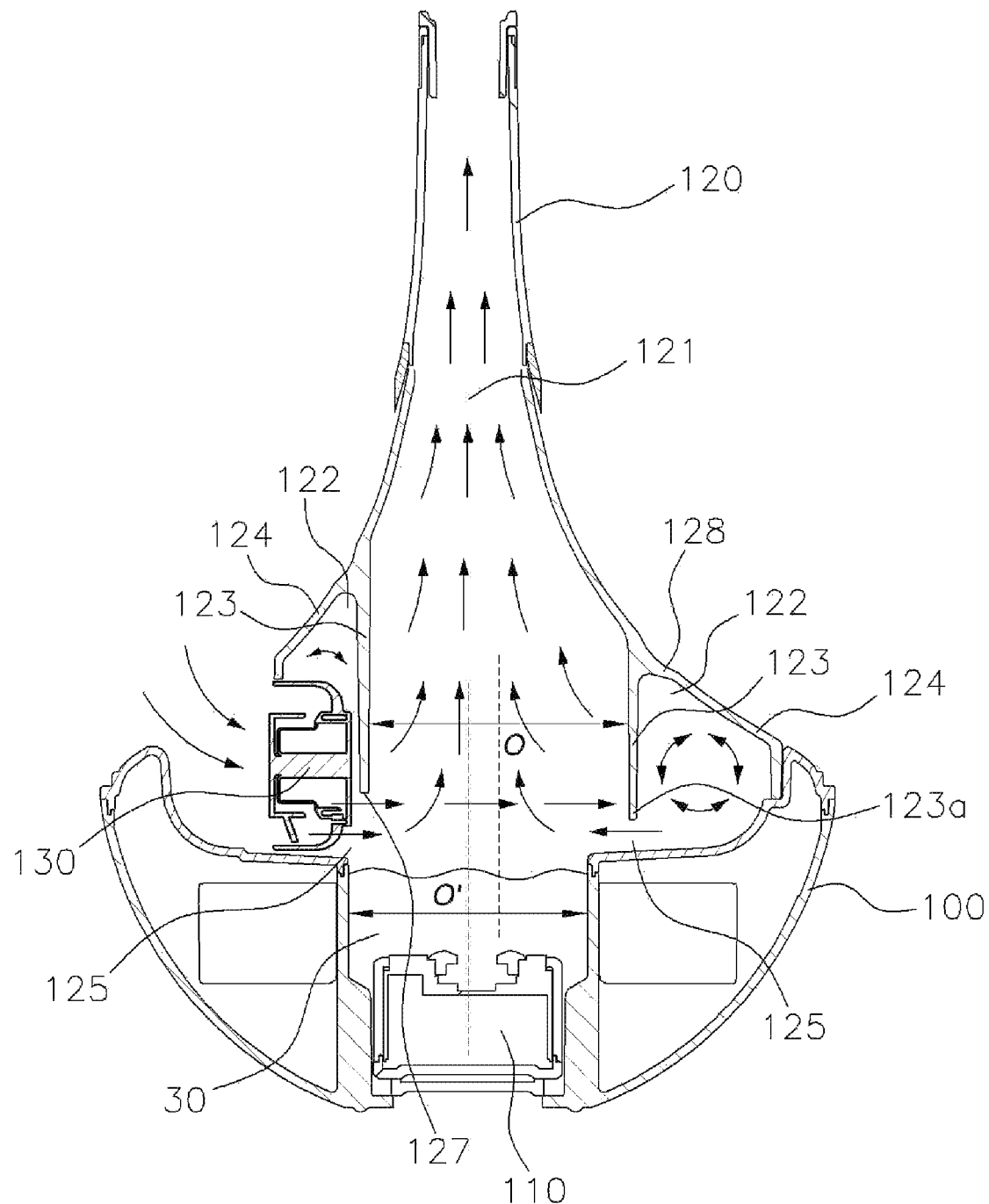
FIG. 5 is a cross-sectional view taken by vertically cutting the floating type humidifier in FIG. 3 based on a blower fan of the floating type humidifier.
Figure 6:
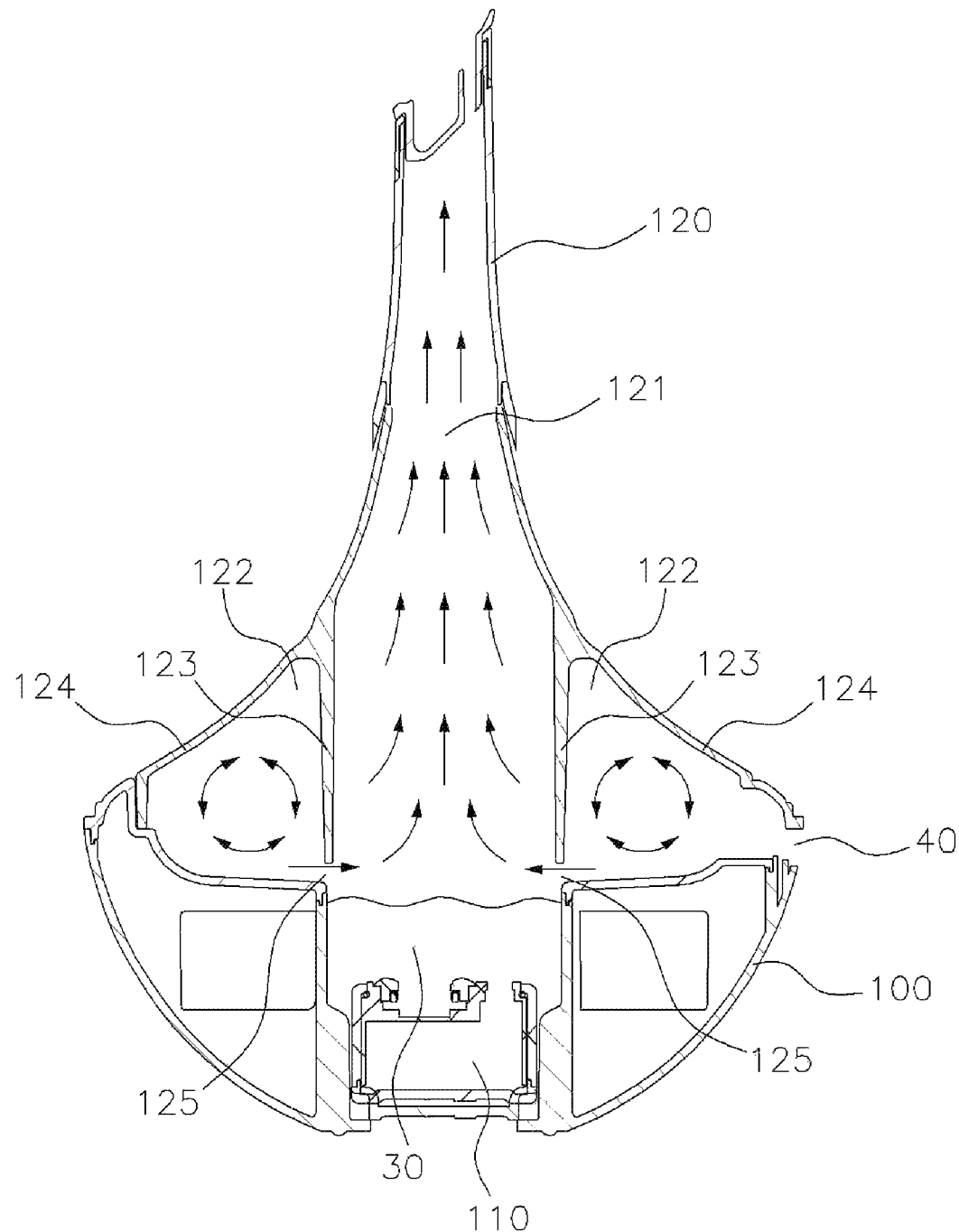
FIG. 6 is a cross-sectional view taken by vertically cutting the floating type humidifier based on the cross-sectional view of FIG. 5.
Figure 7:
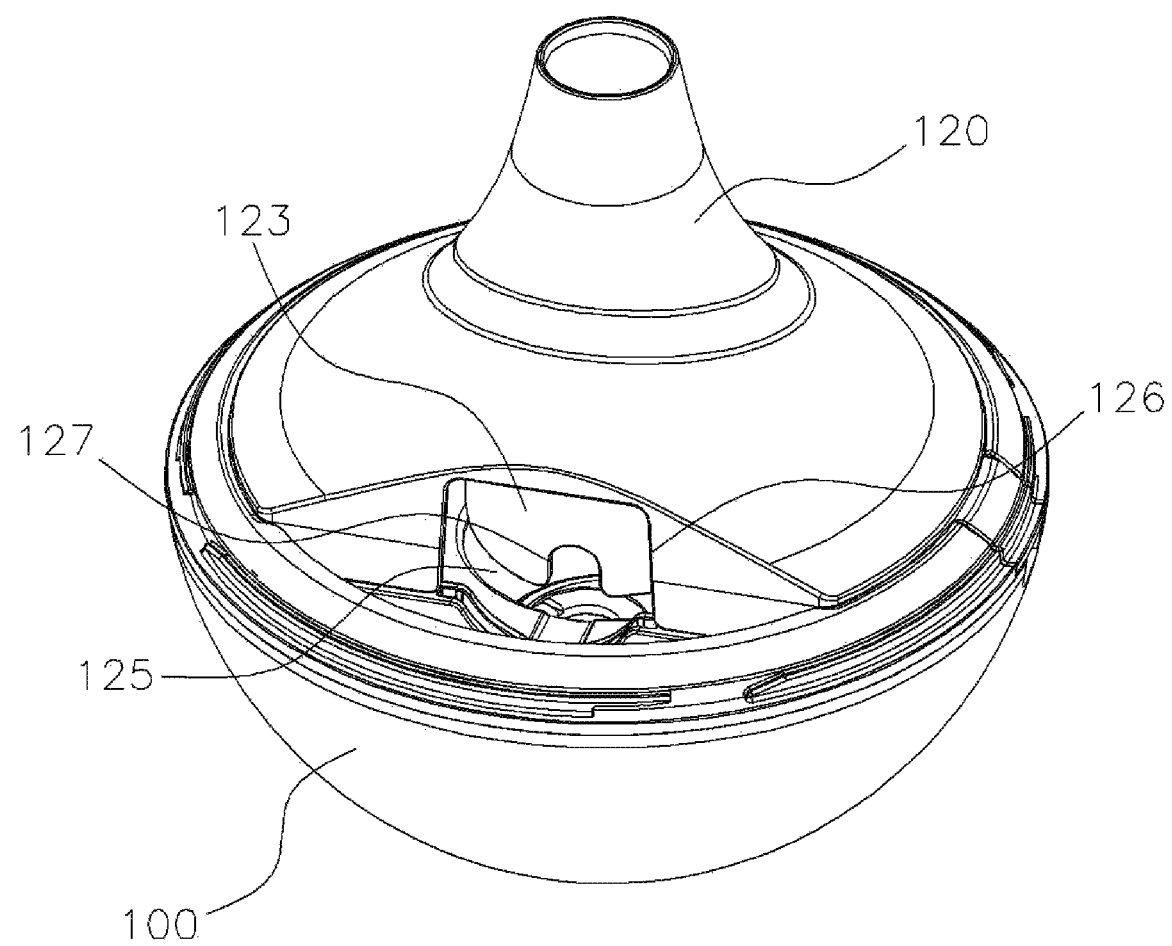
FIG. 7 is a perspective view of the floating type humidifier except for the blower fan in FIG. 3.
Figure 8:
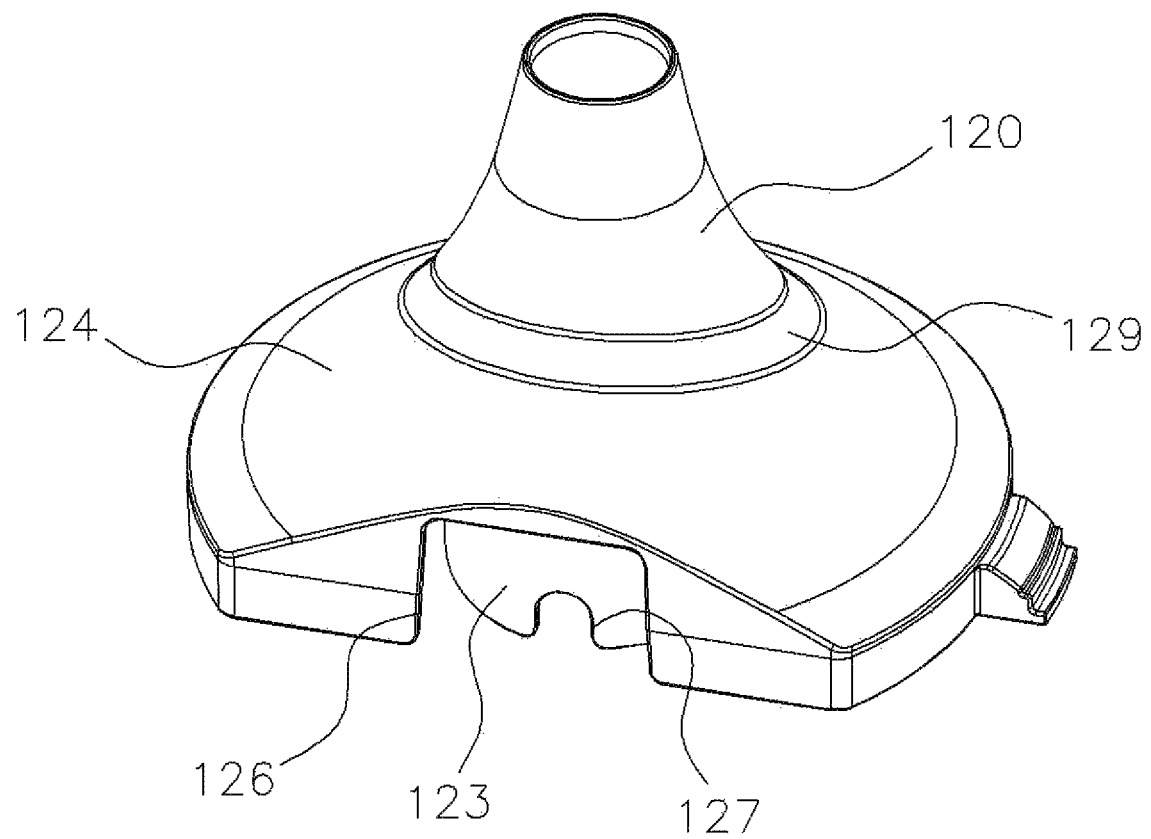
FIG. 8 is a perspective view of a humidification particle guide unit according to the exemplary embodiment of the present invention.
Figure 9:
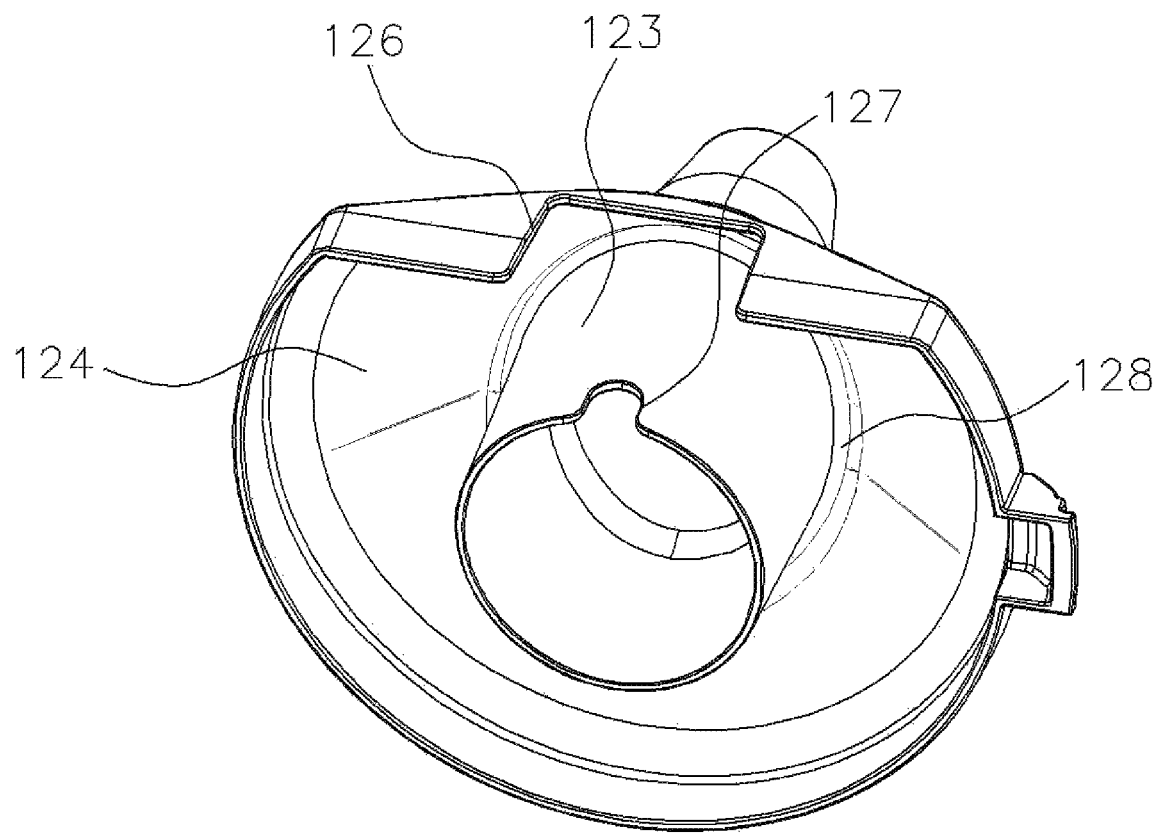
FIG. 9 is a bottom perspective view of the humidification particle guide unit according to the exemplary embodiment of the present invention.

FIG. 3 is a perspective view of the floating type humidifier except for the upper casing in FIG. 1, FIG. 4 is an exploded perspective view of the floating type humidifier except for the upper casing in FIG. 2, FIG. 5 is a cross-sectional view taken by vertically cutting the floating type humidifier in FIG. 3 based on a blower fan of the floating type humidifier, FIG. 6 is a cross-sectional view taken by vertically cutting the floating type humidifier based on the cross-sectional view of FIG. 5, and FIG. 7 is a perspective view of the floating type humidifier except for the blower fan in FIG. 3.

Referring to FIGS. 3 to 7, the floating type humidifier with the increased humidification amount according to the exemplary embodiment of the present invention includes the floating body 100, the ultrasonic generator 110, the humidification particle guide unit 120, and an air pressurizing portion 122.

First, the floating body 100 floats on the water accommodated in the water tub, and a hollow portion 101 may be vertically and penetratively formed in a central portion of the floating body 100.

Here, the floating body 100 may include a lower body which has a buoyancy space formed along an inner rim of the lower body so that the floating body 100 may float on the water, and an upper body which is coupled to an upper portion of the lower body, such that the buoyancy space for generating buoyancy may be formed in the floating body 100.

Further, the floating body 100 may have a shape having a narrow lower portion and a diameter that gradually increases toward an upper portion, but the shape of the floating body 100 is not limited thereto, and the floating body 100 may have various shapes.

In addition, an inlet port may be formed in the lower portion of the floating body 100 so that water 30 may be introduced, and the inlet port may be in communication with the hollow portion 101 along an upper portion of the floating body 100.

The ultrasonic generator 110 is configured to atomize the water 30, which is introduced through the inlet port of the floating body 100, to create fine water particles, that is, humidification particles.

To this end, the ultrasonic generator 110 may be installed in the hollow portion 101 of the floating body 100 and may atomize the water 30, which is introduced at the lower side, to create the humidification particles by using ultrasonic vibration.

Here, a separate power cable may be connected to the ultrasonic generator 110 or the blower fan 130 to be described below, and the power cable may extend to the outside through a cable hole 40.

Further, the ultrasonic generator 110 may discharge the humidification particles in a direction of a vertical line to a center of the hollow portion 101.

The humidification particle guide unit 120 is installed on the upper portion of the floating body 100 and may guide the humidification particles so that the humidification particles move upward along the guide hole 121 in the humidification particle guide unit 120.

A horizontal cross section of the guide hole 121 may have various shapes such as a circular shape, an elliptical shape, or a polygonal shape.

The humidification particle guide unit 120 is installed above the hollow portion 101 of the floating body 100, and particularly, the humidification particle guide unit 120 may be positioned above the ultrasonic generator 110 installed in the hollow portion 101.

Here, the guide hole 121 is vertically and penetratively formed in the humidification particle guide unit 120, such that the humidification particles may be moved upward along the guide hole 121.

In addition, the guide hole 121 is shaped such that a diameter thereof gradually decreases toward the upper portion, and a discharge port may be penetratively formed outward at an upper end of the guide hole 121.

The air pressurizing portion 122 is provided in the humidification particle guide unit 120 and pressurizes air so that the humidification particles may be moved upward by the pressurized air.

To this end, the humidification particle guide unit 120 may have a double partition wall structure including an inner wall 123 which extends downward along the guide hole 121, and an outer wall 124 which is formed to be inclined outward from the inner wall 123 and configured to be coupled to the floating body 100.

That is, the air pressurizing portion 122 may be formed between the inner wall 123 and the outer wall 124 of the humidification particle guide unit 120.

As air is consistently introduced into the air pressurizing portion 122, internal pressure of the air pressurizing portion 122 is increased and thus air pressure is increased. As the air pressure is increased, the air introduced by the blower fan has higher propulsive force, such that the air is strongly introduced into the guide hole 121, and as a result, the humidification amount may be increased.

To this end, the humidification particle guide unit 120 may include an air introduction portion 125 which corresponds to a predetermined gap by which the inner wall 123 of the humidification particle guide unit 120 and the floating body 100 are spaced apart from each other. The air pressurizing portion 122 and the guide hole 121 may be in communication with each other through the air introduction portion 125.

Therefore, unlike the related art in which air is supplied in a particular direction or through a particular hole, the air introduction portion 125 introduces air through the entire periphery of the guide hole 121 in the present invention, and as a result, the humidification amount may be increased. Therefore, the air pressurized by the air pressurizing portion 122 is introduced, such that the humidification amount may be maximized.

A fan installation hole 126 may be penetratively formed in an outer portion of the humidification particle guide unit 120, and the blower fan 130, which blows air toward the air pressurizing portion 122, may be installed in the fan installation hole 126.

When the air created by the blower fan 130 or the wind formed by the air is blown toward the air pressurizing portion 122, air pressure is formed in the air pressurizing portion 122, such that the air with raised pressure may be strongly introduced into the guide hole 121 while passing through the air introduction portion 125.

As the gap between the inner wall 123 of the humidification particle guide unit 120 and the floating body 100 is increased, an introduction speed of the air may be increased, but the air pressure, which may be formed in the air pressurizing portion 122, may be decreased. As the gap between the inner wall 123 of the humidification particle guide unit 120 and the floating body 100 is decreased, the introduction speed of the air may be decreased, but the air pressure, which may be formed in the air pressurizing portion 122, may be increased. Therefore, it may be necessary to adjust a size of the gap in accordance with the situation.

In addition, the humidification particle guide unit 120 may include a recessed groove portion 127 which is recessed to have a predetermined size at an end of the inner wall 123 of the humidification particle guide unit 120. In this case, the recessed groove portion 127 may be formed at a position facing the blower fan 130.

The recessed groove portion 127 allows the air, which is introduced from the blower fan 130, to be introduced directly into the guide hole without colliding with the inner wall 123 of the humidification particle guide unit 120, thereby pushing the particles, which have larger sizes among the created humidification particles, toward the inner wall 123 at another side.

Meanwhile, a center O of the inner wall of the humidification particle guide unit 120 and a center O' of the hollow portion of the floating body 100 may be disposed on different vertical lines. More particularly, one side 123*a* of the inner wall of the humidification particle guide unit 120 may extend to be directed toward the outside of the hollow portion 101 of the floating body 100.

With the aforementioned structure, the inner wall 123 of the humidification particle guide unit 120 is shaped to be tilted toward one side, such that when the humidification particles created by the ultrasonic generator 110 move upward, the humidification particles collide with the inner wall 123 of the humidification particle guide unit 120 formed asymmetrically. Therefore, it is possible to minimize noise that occurs when the integrated humidification particles fall outside the hollow portion 101 and collide with the water surface outside the hollow portion 101 instead of colliding with the water 30 that fills the hollow portion 101.

FIG. 8 is a perspective view of the humidification particle guide unit according to the exemplary embodiment of the present invention, and FIG. 9 is a bottom perspective view of the humidification particle guide unit according to the exemplary embodiment of the present invention.

Referring to FIGS. 8 and 9, the humidification particle guide unit 120 may include a cleaning groove portion 128 provided in an inner circumferential surface where the inner wall 123 and the outer wall 124 of the humidification particle guide unit 120 abut each other, and the cleaning groove portion 128 is recessed to be more gradual than the inclination of the outer wall 124.

Since the cleaning groove portion 128 having a curved groove shape is formed in the inner circumferential surface where the inner wall 123 and the outer wall 124 of the humidification particle guide unit 120 abut each other, it is possible to easily clean the entire inner circumferential surface of the humidification particle guide unit 120.

In addition, the humidification particle guide unit 120 may include a gripping groove portion 129 provided in an outer circumferential surface where the inner wall 123 and the outer wall 124 of the humidification particle guide unit 120 abut each other, and the gripping groove portion 129 is recessed at a side opposite to the cleaning groove portion 128.

Because the gripping groove portion 129, which has a groove shape recessed inward, is formed in the outer circumferential surface where the inner wall 123 and the outer wall 124 of the humidification particle guide unit 120 abut each other, the gripping groove portion 129 may be used as a handle when cleaning the humidifier or when the humidifier needs to be gripped. While the specific exemplary embodiments according to the present invention have been described above, the exemplary embodiments may of course be modified to various exemplary embodiments without departing from the scope of the present invention. Therefore, the scope of the present invention should not be limited to the described exemplary embodiments, and should be defined by not only the claims to be described below, but also those equivalents to the claims.

While the present invention has been described above with reference to the limited exemplary embodiments and the drawings, but the present invention is not limited to the exemplary embodiments, and may be variously modified and altered from the disclosure by those skilled in the art to which the present invention pertains. Therefore, the spirit of the present invention should be defined by the appended claims, and all of the equivalents or equivalent modifications of the claims belong to the scope of the spirit of the present invention.

The invention claimed is:

1. A floating type humidifier with an increased humidification amount, comprising:

a floating body which floats on water accommodated in a water tub and has a hollow portion vertically and penetratively formed at a central portion of the floating body;

an ultrasonic generator which is installed in the hollow portion and configured to atomize water, which is introduced at a lower portion, to create humidification particles by using ultrasonic vibration;

a humidification particle guide unit which is installed on an upper portion of the floating body and guides the humidification particles so that the humidification particles move upward along a guide hole in the humidification particle guide unit; and an air pressurizing portion which is provided in the humidification particle guide unit and pressurizes air so that the humidification particles are moved upward by the pressurized air.

2. The floating type humidifier of claim 1, wherein the humidification particle guide unit has a double partition wall structure including an inner wall which extends downward along the guide hole, and an outer wall which is formed to be inclined outward from the inner wall and configured to be coupled to the floating body.

3. The floating type humidifier of claim 2, wherein the air pressurizing portion is formed between the inner wall and the outer wall of the humidification particle guide unit.

4. The floating type humidifier of claim 2, wherein the humidification particle guide unit includes an air introduction portion formed as the inner wall of the humidification particle guide unit and the floating body are spaced apart from each other at a predetermined gap, and the air pressurizing portion and the guide hole are in communication with each other through the air introduction portion.

5. The floating type humidifier of claim 4, wherein a fan installation hole is penetratively formed in an outer portion of the humidification particle guide unit, and a blower fan, which blows air toward the air pressurizing portion, is installed in the fan installation hole.

6. The floating type humidifier of claim 5, wherein the humidification particle guide unit includes a recessed groove portion recessed to have a predetermined size at an end of the inner wall of the humidification particle guide unit, and the recessed groove portion is formed at a position facing the blower fan.

7. The floating type humidifier of claim 2, wherein a horizontal cross section of the guide hole has a circular shape, an elliptical shape, or a polygonal shape.

8. The floating type humidifier of claim 2, wherein a center of the inner wall of the humidification particle guide unit and a center of the hollow portion of the floating body are disposed on different vertical lines.

9. The floating type humidifier of claim 8, wherein one side of the inner wall of the humidification particle guide unit extends toward the outside of the hollow portion of the floating body.

10. The floating type humidifier of claim 2, wherein the humidification particle guide unit includes a cleaning groove portion provided in an inner circumferential surface where the inner wall and the outer wall of the humidification particle guide unit abut each other, and the cleaning groove portion is recessed to be more gradual than the inclination of the outer wall.

11. The floating type humidifier of claim 10, wherein the humidification particle guide unit includes a gripping groove portion provided in an outer circumferential surface where the inner wall and the outer wall of the humidification particle guide unit abut each other, and the gripping groove portion is recessed at a side opposite to the cleaning groove portion.

* * * * *